United States Patent [19]

Fujii et al.

[11] Patent Number: 4,658,501

[45] Date of Patent: Apr. 21, 1987

[54] AUTOMOBILE ASSEMBLING APPARATUS

[75] Inventors: Hiroshi Fujii; Shunji Sakamoto, both of Higashi-Hiroshima; Kunji Kimura, Hiroshima, all of Japan

[73] Assignee: Mazda Motor Corporation, Hiroshima, Japan

[21] Appl. No.: 753,141

[22] Filed: Jul. 9, 1985

[30] Foreign Application Priority Data

Jul. 10, 1984 [JP] Japan ............................ 59-142879

[51] Int. Cl.⁴ .................. B23P 21/00; B23P 19/00; B66C 23/00
[52] U.S. Cl. .................................. 29/787; 29/824; 414/743
[58] Field of Search ................. 29/787, 793–795, 29/822–824; 414/743, 589, 590

[56] References Cited

U.S. PATENT DOCUMENTS

| 2,785,807 | 3/1957 | Prowinsky | 414/589 |
| 3,630,389 | 12/1971 | Schmidt et al. | 414/743 |
| 4,023,639 | 5/1977 | Perhed | 29/824 |
| 4,280,785 | 7/1981 | Albrecht | 414/743 |
| 4,479,632 | 10/1984 | McIntire et al. | 414/743 |

FOREIGN PATENT DOCUMENTS

| 3150476 | 6/1983 | Fed. Rep. of Germany | 29/824 |
| 57-50181 | 11/1982 | Japan . | |

Primary Examiner—Howard N. Goldberg
Assistant Examiner—Steven Nichols
Attorney, Agent, or Firm—Fleit, Jacobson, Cohn & Price

[57] ABSTRACT

A vehicle assembling apparatus including a part transfer arm supported at one end for swingable movements about vertical and horizontal axes, a part carrying plate provided at the other end of the transfer arm for carrying a part to be assembled, and a fastener driving tool for driving fasteners. The fastener driving tool is supported on the part carrying plate for swinging movements about a vertical axis and for adjustment of the distance between the part carrying plate and the fastener driving tool.

8 Claims, 3 Drawing Figures

AUTOMOBILE ASSEMBLING APPARATUS

BACKGROUND OF THE INVENTION

1. Field of the Invention

The present invention relates to an apparatus for assembling vehicles and more particularly to an apparatus for assembling vehicle parts on other vehicle parts such as vehicle bodies. More specifically, the present invention pertains to an assembling apparatus which is adapted to locate vehicle parts with respect to other vehicle parts such as vehicle bodies and to secure them thereto by means of fasteners.

2. Description of the Prior Art

Conventionally, in a vehicle assembling line, for example in a line where an engine and a suspension assembly are mounted on a vehicle body, the engine and the suspension assembly are transferred to a station beneath the body by means of a transfer table and the table is then lifted to raise the engine and the suspension assembly to positions where they are mounted on the body. An example of such apparatus is disclosed by Japanese utility model publicaiton 57-50181 published on Nov. 2, 1982. Although not described in the utility model, the engine and the suspension assembly thus located are secureed to the body by means of fasteners such as bolts. Such fastening steps are generally carried out through manual operations. However, it is desirable to carry out the fastening steps automatically. For that purpose, the assembling apparatus may be provided with a fastening device in addition to the aforementioned part locating device. It should however be noted that the fastening device must be operationally synchronized with the locating device and, moreover, must be precisely located with respect to the locating device.

SUMMARY OF THE INVENTION

It is therefore an object of the present invention to provide a vehicle parts assembling apparatus which is able not only to locate parts, with respect to other parts but also to secure the first mentioned parts to the second mentioned parts.

Another object of the present invention is to provide a vehicle parts assembling apparatus having parts locating means and parts fastening means, in which the parts fastening means can readily be located with respect to the parts locating means.

A further object of the present invention is to provide a vehicle parts assembling apparatus which can locate and secure a vehicle part to another vehicle part.

According to the present invention, the above and other objects can be accomplished by a vehicle assembling apparatus including part transfer arm means supported at one end for swingable movements about a vertical axis and a horizontal axis, part carrying means provided at the other end of the transfer arm means for carrying a part to be assembled, fastener driving means for driving fasteners, support means for supporting the fastener driving means on said part carrying means for swinging movements about a vertical axis and for adjustment in distance between the part carrying means and the fastener driving means.

According to a preferable aspect of the present invention, the part carrying means is mounted on the other end of the transfer arm means for swingable movements about a horizontal axis and the support means for supporting the fastener drive means includes a swingable arm mounted on the part carrying means for swingable movements about a vertical axis with respect to the part carrying means, the fastener driving means being supported on the swingable arm slidably along the swingable arm. The part transfer arm means is swingable in vertical and horizontal planes so that it is possible to receive a part to be assembled from a transfer conveyor, transfer it to an assembling position and locate it accurately on another part on which the first mentioned part is to be mounted. The fastener driving means is adjustable in position with respect to the part carrying means in respect of the swinging angle about the vertical axis and the distance from the part carrying means, so that it is possible to locate the fastener driving means accurately with respect to the part to be assembled and secure the part to the second mentioned part by driving fasteners such as fastening bolts.

The above and other objects and features of the present invention will become apparent from the following description of a preferred embodiment taking reference to the accompanying drawings.

DESCRIPTION OF THE PREFERRED EMBODIMENT

Figure 1:
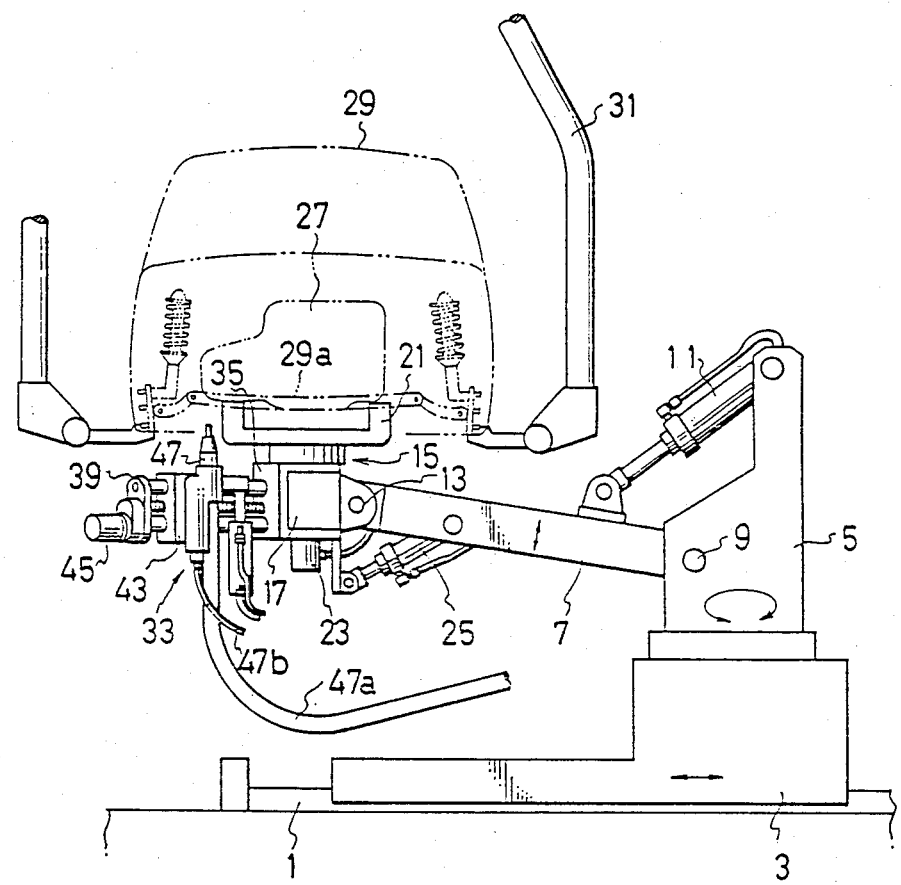
FIG. 1 is a front view of an apparatus for assembling an engine unit in a vehicle body.

Referring to FIG. 1, there is shown an assembling apparatus embodying the features of the present invention and including a transfer table 3 movable along transverse rails 1 provided on the floor. On the transfer table 3, there is mounted a rotatable body 5 which is rotatable about a vertical axis. The body 5 carries a part transfer arm 7 which is mounted at one end on the body 5 for swingable movement about a horizontal shaft 9. The movement of the transfer table 3 along the rails 1 and the swinging movement of the body 5 about the vertical axis are carried out by means of motors and associated gear mechanisms provided in the table 3 and the body 5. A cylinder 11 is provided for effecting the vertical swinging movement of the part transfer arm 7.

Figure 2:
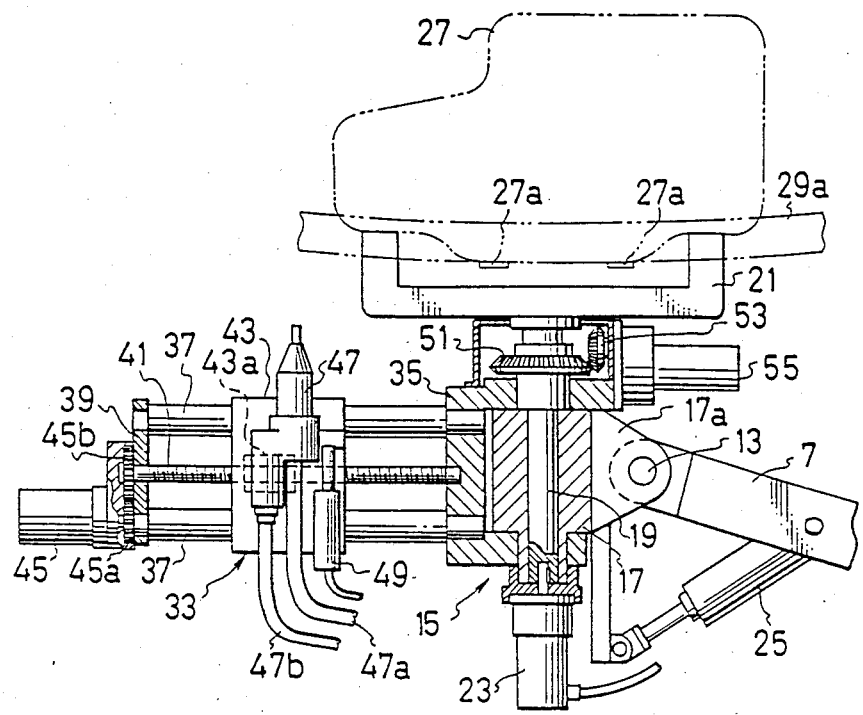
FIG. 2 is an enlarged front view particularly showing the bolt driving means; and, FIG. 3 is a bottom view of the bolt driving means.
Figure 3:
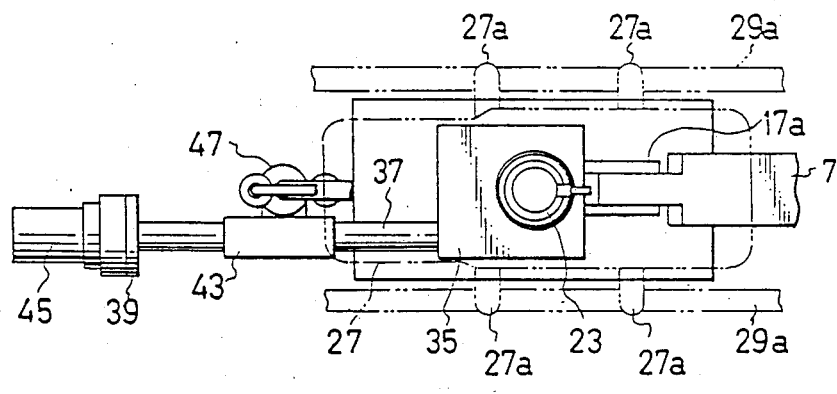

The part transfer arm 7 has a part carrying device 15 at the free end thereof. The part carrying device 15 is mounted on the free end of the arm 7 for vertical swinging movements about a horizontal shaft 13. As shown in FIG. 2, the part carrying device 15 includes a housing 17 having lugs 17a which are mounted on the arm 7 through the shaft 13. The housing 17 carries a rotatable shaft 19 which extends vertically through the housing 17 and projects upwards from the housing 17. The rotatable shaft 19 is attached at the upper end with a part carrying plate 21. The lower end of the rotatable shaft 19 is connected with the output shaft of a pulse motor 23 which is mounted on the housing 17, whereby the shaft 19 and the part carrying plate 21 are rotatably driven by the pulse motor 23. A cylinder 25 is provided for adjusting the inclination of the housing 17 and therefore the inclination of the part carrying plate 21.

The part transfer arm 7 can be moved through a rotation of the rotatable body 5 to a part receiving position where the part carrying plate 21 can reach the part transfer conveyor (not shown). In the part receiving position, the plate 21 receives from the conveyor a part to be assembled and the arm 7 is again swingably moved to place the part in an assembling position. The illustrated apparatus is designed for assembling an engine unit 27 on a vehicle body 29 so that the engine unit 27 is placed on the plate 21 at an accurate position. For that purpose, the plate 21 has locating means for accurately locating the engine 27. Such locating means is well known in the art and may include locating pins provided on the the plate 21 and locating holes formed in the engine 27 for engagement with the locating pins.

The vehicle body 29 on which the engine 27 is to be mounted is transferred by being carried by a hanger 31 and located in position at the engine mounting station. The vehicle body 29 has a frame 29a which extends transversely in the engine compartment and the engine 27 is provided at the lower position thereof with frames 27a which are adapted to be attached to the frame 29a on the body 29. Through appropriate operations of the transfer table 3, the rotatable body 5, the transfer arm 7 and the rotatable shaft 19, the engine 27 is moved from the bottom to the engine compartment and located in a predetermined position wherein the frames 27a on the engine 27 are engaged with the lower side of the frame 29a on the body 29.

In order to secure the frames 27a on the engine 27 to the frame 29a on the body 29, there is provided a bolt driving device 33 which includes a rotatable housing 35 mounted rotatably on the shaft 19. A pair of vertically spaced guide arms 37 extend horizontally from the housing 35 and an end plate 39 is attached to the outer ends of the guide arms 37. Between the guide arms 37, there is a drive screw 41 which extends in parallel with the guide arms 37. The drive screw 41 is rotatably carried at the opposite ends respectively by the housing 35 and the end plate 39. The guide arms 37 carry a tool mounting plate 43 which is slidable along the guide arms 37. The plate 43 has a nut 43a which is engaged with the drive screw 41 so that the tool mounting plate 43 is moved along the guide arms 37 through a rotation of the drive screw 41. On the end plate 39, there is mounted a pulse motor 45 which drives the screw 41 through the gears 45a and 45b.

The tool mounting plate 43 carries a bolt driving tool 47 which is mounted on the plate 43 for movement in a vertical direction. In order to make it possible to adjust the vertical position of the bolt driving tool 47, a cylinder 49 is provided on the plate 43. The tool 47 has a bolt feeding pipe 47a for automatically feeding bolts to the tool 47 and an air supply pipe 47b for supplying compressed air to the air motor provided in the tool 47.

The rotatable shaft 19 is provided at an upper portion with a bevel gear 51 and the rotatable housing 35 carries a bevel gear 53 which is engaged with the bevel gear 51. The bevel gear 53 is driven by a pulse motor 55 which is mounted on the housing 35. A gear mechanism may be provided if necessary between the bevel gear 53 and the pulse motor 55. The rotation of the shaft 19 and therefore the rotation of the bevel gear 51 are governed by the pulse motor 23 so that the housing 35 is rotated by the pulse motor 55 to turn the arm 37. With this mechanism, it is possible to align the bolt driving tool 47 accurately to a position where a bolt is to be installed. When the bolt driving tool 47 is thus placed in position, a bolt is fed through the bolt feeding pipe 47a and the tool 47 is operated to drive the bolt into a nut which is in advance provided on the frame 29a of the vehicle body 29. Thus, the engine 27 is mounted on the body 29.

The invention has thus been shown and described with reference to a specific embodiment. However, it should be noted that the invention is in no way limited to the details of the illustrated structures, but changes and modifications may be made without departing from the scope of the appended claims.

We claim:

1. A vehicle assembling apparatus including part transfer arm means supported at one end for swingable movements about a vertical axis and a horizontal axis, part carrying means provided at the other end of the transfer arm means for carrying a part to be assembled, fastener driving means for driving fasteners, support means for supporting the fastener driving means on said part carrying means for swinging movements about a vertical axis and for adjustment of the distance between the part carrying means and the fastener driving means, said support means including a swingable arm mounted on the part carrying means for swingable movements about a vertical axis with respect to the part carrying means, the fastener driving means being slidably supported on the swingable arm for movement along the swingable arm, and position adjusting means for adjusting the position of the fastener driving means on the swingable arm.

2. A vehicle assembling apparatus in accordance with claim 1 in which said part transfer arm means is mounted at said one end on a rotatable support which is provided on a transfer table movable in a direction perpendicular to a direction in which assembled parts are to be transported.

3. A vehicle assembling apparatus in accordance with claim 1 in which said part carrying means is mounted on the other end of the transfer arm means for swingable movements about a horizontal axis.

4. A vehicle assembling apparatus in accordance with claim 1 in which said position adjusting means includes screw means extending in parallel with the swingable arm, nut means provided on said fastener driving means and engaged with said screw means, and motor means for driving the screw means.

5. A vehicle assembling apparatus in accordance with claim 1 in which said fastener driving means includes fastener feeding means for automatically feeding fasteners to the fastener driving means.

6. A vehicle assembling apparatus in accordance with claim 1 in which said part carrying means in provided with rotating means for rotating said part carrying means on the transfer arm means.

7. A vehicle assembling apparatus in accordance with claim 1 in which said part carrying means is provided on a vertical shaft rotatable on a housing which is mounted on said other end of the transfer arm means, and motor means for rotating said vertical shaft.

8. A vehicle assembling apparatus in accordance with claim 7 in which said support means includes a vertical shaft carried by said part carrying means, said swingable arm means connected to said vertical shaft for swinging movements about said vertical axis, and second motor means for effecting a swinging movement of said swingable arm means, said fastener driving means being supported on said swingable arm means slidably along said swingable arm means.

* * * * *